A. F. AUDERER.
COCK.
APPLICATION FILED MAR. 3, 1921.
1,393,418.
Patented Oct. 11, 1921.
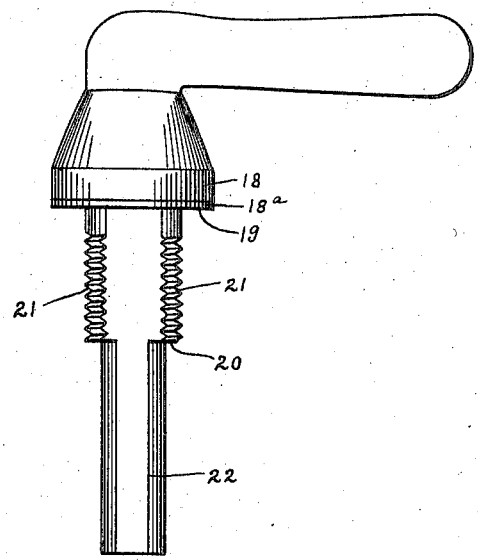
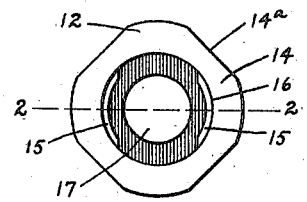
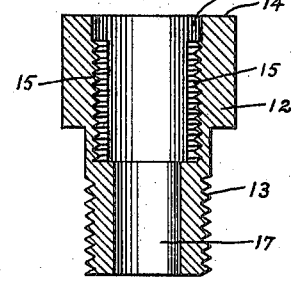
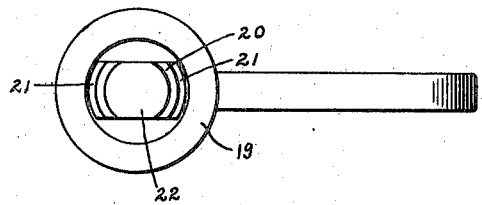
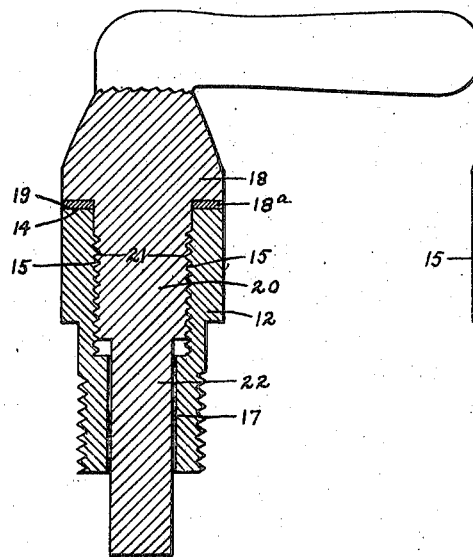
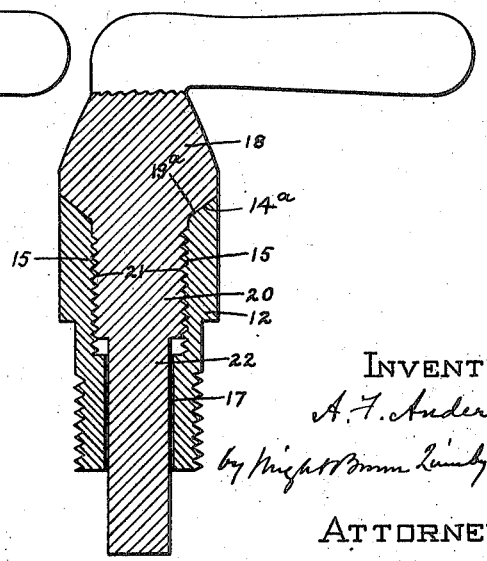
INVENTOR
A. F. Auderer
ATTORNEYS

UNITED STATES PATENT OFFICE.

ALBERT F. AUDERER, OF WOLFEBORO, NEW HAMPSHIRE.

COCK.

1,393,418.   Specification of Letters Patent.   Patented Oct. 11, 1921.

Application filed March 3, 1921.  Serial No. 449,301.

*To all whom it may concern:*

Be it known that I, ALBERT F. AUDERER, a citizen of the United States, residing at Wolfeboro, in the county of Carroll and State of New Hampshire, have invented new and useful Improvements in Cocks, of which the following is a specification.

This invention is embodied in a cock adapted to be used as a priming cock to admit a priming charge of gasolene to the combustion chamber of an internal combustion engine, and as a drainage or pet cock to draw liquid from a receptacle such as the water-containing portion of an automobile radiator.

A cock embodying the invention comprises a tubular body member adapted for attachment, as a conduit, to a container such as a combustion chamber, or a liquid receptacle, and provided with an annular valve seat at its outer end surrounding its bore, and an elongated closing member formed to coöperate with the body member in closing the latter at its valve seat, and in preventing an accumulation of foreign matter in the bore of the body member, means being provided for separably and quickly connecting the two members.

Of the accompanying drawings forming a part of this specification,—

Figure 1 is an end view of the body member, looking toward its outer end.

Fig. 2 is a section on line 2—2 of Fig. 1.

Fig. 3 is a side view of the closing member.

Fig. 4 is an end view of the closing member, looking toward its inner end.

Fig. 5 is a sectional view, showing the members operatively connected.

Fig. 6 is a view similar to Fig. 5, showing a different form of valve seat and valve face.

The same reference characters indicate the same parts in all of the figures.

In the drawings, 12 represents the body member of the improved cock, the same being tubular, and adapted for attachment to a container, preferably by providing the inner end portion with an external screw thread 13, adapted to engage an internal thread in an orifice in the container wall, the body member constituting a conduit, adapted to conduct liquid either to or from the container. The outer portion of the body member may have faces $14^a$, as shown by Fig. 1, adapted to be engaged by a wrench. The outer end of the body member 12 constitutes an annular valve seat 14, surrounding the bore. The outer portion 16 of the bore, adjacent to the valve seat, is enlarged and provided with a mutilated internal screw thread, which includes two series of thread segments 15 spaced apart, as shown by Figs. 1 and 2. The bore includes a reduced inner portion 17 concentric with the enlarged portion 16.

The closing member is elongated, and includes an enlargement 18, forming a valve portion having an annular face 19, formed to close on the seat 14, said face being preferably one side of a washer $18^a$ which, although in effect a part of the valve portion, is separable therefrom, and may be renewed when worn.

The closing member also includes a stem having an enlarged outer portion 20, provided with a mutilated external screw thread, which includes two series of thread segments 21 spaced apart, as shown by Figs. 3 and 4. Said stem has a reduced inner portion 22, formed to have a close sliding fit in the bore portion 17 of the body member.

The arrangement of the said internal and external thread segments is such that the closing member may be inserted in the body member by a rectilinear endwise movement, the thread segments of the closing member sliding between those of the body member, until the valve face 19 comes to a bearing on the seat 14. A partial rotation of the closing member then causes the interengagement of its thread segments with those of the body member, and a firm pressure of the valve face against the seat. Said endwise movement causes the reduced stem portion 22 to enter the reduced bore portion 17.

It will now be seen that the closing portion is quickly attachable to, and detachable from the body portion. It will also be seen that when the device is used as a priming cup, the body portion being attached to a combustion chamber wall, with its valve seat end uppermost, so that gasolene may be introduced through it to the combustion chamber, the reduced plug portion 22 prevents an accumulation of carbon in the bore portion 17 of the body member.

The device may be inverted from the position shown, and attached with its valve seat end downward to a receptacle containing liquid, to constitute a drainage or pet cock, the reduced stem portion 22 preventing deposits of sediment in the bore portion 17 of the body member.

As shown by Fig. 6, the valve seat 14ª and valve face 19ª may be of frusto-conical form, the washer being omitted.

I claim:

A cock of the character stated comprising a tubular body member, adapted for attachment as a conduit to a container, and having an annular valve seat at its outer end surrounding its bore, said bore extending from end to end of the body member, and including an enlarged portion adjacent to the valve seat, having a mutilated internal screw thread, and a reduced portion extending from the enlarged portion to the inner end of the body member; and an elongated closing member including an enlargement forming a valve portion having an annular face formed to close upon said seat, and a stem having an enlarged outer portion provided with a mutilated external-screw thread, formed to coöperate, as described, with said mutilated internal thread, and a reduced inner portion formed to occupy the reduced portion of the body member bore.

In testimony whereof I have affixed my signature.

ALBERT F. AUDERER.